United States Patent
Sirtori

(10) Patent No.: US 7,924,267 B2
(45) Date of Patent: Apr. 12, 2011

(54) POINTING DEVICE FOR A COMPUTER SYSTEM WITH AUTOMATIC DETECTION OF LIFTING, AND RELATIVE CONTROL METHOD

(75) Inventor: Daniele Sirtori, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 950 days.

(21) Appl. No.: 11/771,957

(22) Filed: Jun. 29, 2007

(65) Prior Publication Data

US 2008/0122788 A1    May 29, 2008

Related U.S. Application Data

(63) Continuation of application No. PCT/EP2005/056917, filed on Dec. 19, 2005.

(30) Foreign Application Priority Data

Dec. 29, 2004  (EP) .................................. 04425959

(51) Int. Cl.
*G06F 3/033* (2006.01)
*G09G 5/08* (2006.01)
(52) U.S. Cl. ....................... 345/163; 345/167
(58) Field of Classification Search .......... 345/156–158, 345/161, 163–167
See application file for complete search history.

(56) References Cited

U.S. PATENT DOCUMENTS

| | | | |
|---|---|---|---|
| 4,787,051 A | 11/1988 | Olson | |
| 4,839,838 A | 6/1989 | LaBiche et al. | |
| 5,181,181 A | 1/1993 | Glynn | |
| 5,355,146 A * | 10/1994 | Chiu et al. ..................... | 345/156 |
| 5,703,623 A * | 12/1997 | Hall et al. ..................... | 345/158 |
| 5,825,350 A * | 10/1998 | Case et al. ..................... | 345/163 |
| 5,835,077 A * | 11/1998 | Dao et al. ..................... | 345/157 |
| 5,955,668 A | 9/1999 | Hsu et al. | |
| 2003/0142065 A1* | 7/2003 | Pahlavan ....................... | 345/156 |
| 2003/0214484 A1* | 11/2003 | Haywood ..................... | 345/163 |
| 2004/0104891 A1* | 6/2004 | Sacca et al. ................... | 345/156 |
| 2004/0135825 A1 | 7/2004 | Brosnan | |
| 2004/0164962 A1* | 8/2004 | Yin ............................... | 345/163 |
| 2005/0206620 A1* | 9/2005 | Oakley et al. ................ | 345/166 |

FOREIGN PATENT DOCUMENTS

| | | |
|---|---|---|
| EP | 1253399 A1 | 10/2002 |
| EP | 1365211 A1 | 11/2003 |
| JP | 10171596 | 6/1998 |
| JP | 2001142636 | 5/2001 |
| JP | 2004151927 | 5/2004 |

* cited by examiner

*Primary Examiner* — Ricardo L Osorio
(74) *Attorney, Agent, or Firm* — Lisa K. Jorgenson; Hayley J. Stevens; Seed IP Law Group PLLC

(57) ABSTRACT

A pointing device for a computer system includes: a first movement sensor for detecting movements of the device along a first axis and a second axis; a second movement sensor, for detecting movements of the device along a third axis not coplanar with the first and second axes; and a processing unit associated to the movement sensors for producing a plurality of movement signals indicating the movement of the device along the first, second, and third axes. The processing unit includes a control stage, for controlling the production of the movement signals on the basis of a response of the second movement sensor.

32 Claims, 3 Drawing Sheets

POINTING DEVICE FOR A COMPUTER SYSTEM WITH AUTOMATIC DETECTION OF LIFTING, AND RELATIVE CONTROL METHOD

BACKGROUND OF THE INVENTION

1. Field of the Invention

The present invention relates to a pointing device for a computer system with automatic detection of lifting and to a relative control method.

2. Description of the Related Art

As is known, by now all computer systems and other electronic apparatuses equipped with graphic interface are provided with pointing devices, which enable the user to interact in an extremely simple and intuitive way. The most widespread pointing device, namely, the mouse, is provided with a shell, within which a motion transducer is housed. The shell is gripped and translated by the user, generally along a horizontal sliding surface, and the motion transducer sends signals indicating the path followed by the mouse to the computer system. The signals are then processed by the computer system for updating the position of a cursor displayed by the graphic interface. Normally, the mouse is also equipped with one or more pushbuttons, which the user can use for issuing further commands to the computer system.

As regards the movement transducer, different solutions have been proposed. Amongst the most recent and most promising ones, is the use of inertial sensors, in particular two-axes accelerometers made using MEMS (micro-electromechanical systems) technology, which detect the accelerations impressed to the mouse by the user along a sliding surface (hereinafter, mice based upon inertial sensors will, for reasons of simplicity, be referred to as "inertial mice", just as the term "optical mice" is commonly applied to mice that use optical motion transducers). The data regarding accelerations are supplied to a processing unit and integrated in time a first time and a second time, for calculating the instantaneous velocity and the instantaneous position of the mouse, respectively.

A drawback, which regards in particular, but not exclusively, inertial mice, occurs when the user needs to displace the mouse itself without the cursor displayed on the screen of the computer system being moved accordingly (for example, because the mouse has reached an edge of the purposely provided mouse-pad on which it is resting, or in any case the space available in one direction has been used up). Whereas, in the case of optical or electromechanical mice, the movement transducer must necessarily be in contact with or at least in the proximity of the surface of sliding and does not work when it is separated therefrom, inertial sensors continue to operate even when the mouse is lifted. It is therefore not possible, with simple operations, to recover space of maneuver for the user, without moving the cursor displayed by the computer system. In effect, also mice with optical or electromechanical movement transducers are not altogether immune from the problem described, even though they are less sensitive. In fact, an optical movement transducer not correctly coupled to the sliding surface of the mouse in any case receives light stimuli that could be wrongly interpreted. In an electromechanical movement transducer, sliding is possible between the mechanical parts (balls, rollers) even when the mouse is picked up from the sliding surface.

BRIEF SUMMARY OF THE INVENTION

One embodiment of the present invention is a pointing device for a computer system and a method for controlling said device that overcome the above described drawbacks.

According to one embodiment of the present invention, a pointing device for a computer system with automatic detection of the motion state and a method for controlling said device are provided, as defined in claims 1 and 11, respectively.

BRIEF DESCRIPTION OF THE SEVERAL VIEWS OF THE DRAWING(S)

For a better understanding of the invention, there is now described an embodiment thereof, purely by way of non-limiting example and with reference to the attached drawings, wherein.

DETAILED DESCRIPTION OF THE INVENTION

Figure 1:
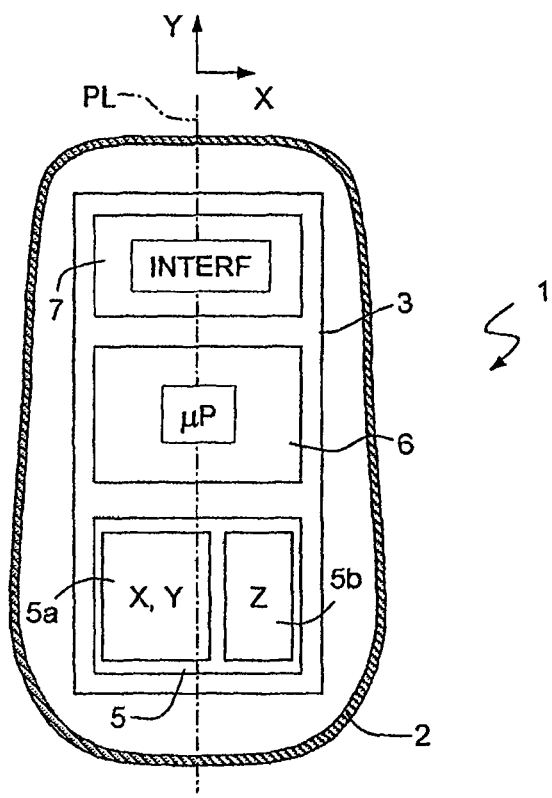
FIG. 1 is a partially sectioned schematic top plan view of a pointing device for a computer system that incorporates one embodiment of the present invention.
Figure 2:
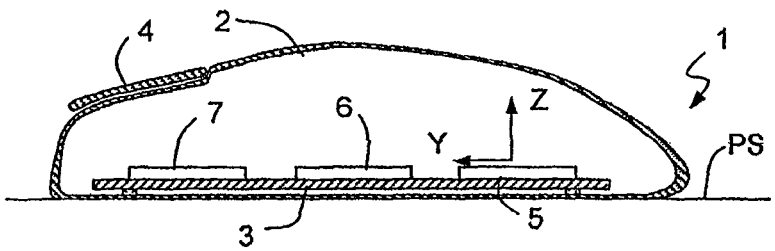
FIG. 2 is a partially sectioned side view of the device of FIG. 1.
Figure 3:
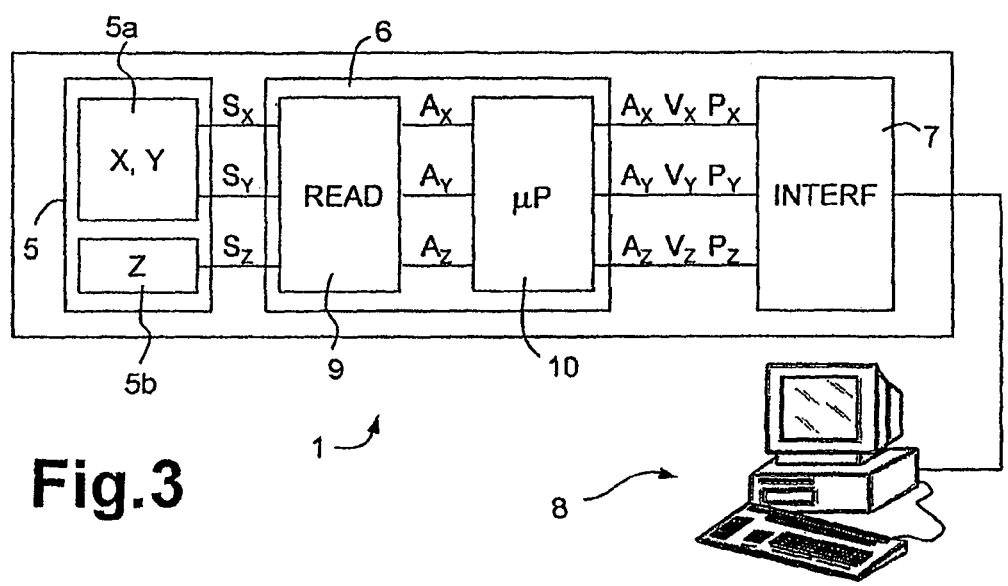
FIG. 3 is a simplified block diagram of the device of FIG. 1.

With reference to FIGS. 1-3, a pointing device of a computer system, in particular a mouse 1, comprises a shell 2, a board 3 housed within the shell 2, an inertial sensor 5, and a microcontroller 6, which are in turn located on the board 3 and form a displacement transducer of the mouse 1. The mouse 1 is also equipped with an interface 7 for connection with a computer system 8 for communicating information and commands under the control of a user. In particular, the interface 7 is of any standard type suitable for supporting communication with the computer system 8, for example, of a serial RS 232 or USB type. Alternatively, the interface 7 enables a wireless connection through an optical (IR) or radiofrequency coupling, for example using Bluetooth technology. The mouse 1 is moreover equipped with one or more pushbuttons and/or wheels 4 for issuing commands to the computer system 8 under the control of a user.

The inertial sensor 5 is connected to the board 3 so as to be fixed with respect to the shell 2 and comprises a first, two-axes, accelerometer 5a and a second, single-axis, accelerometer 5b for detecting accelerations along three independent directions. The first accelerometer 5a and the second accelerometer 5b are both of a micro-electro-mechanical type and are made with MEMS technology; for example, the first accelerometer 5a is of the type described in the European patent application No. EP-A-1365211, filed on May 21, 2002, and the second accelerometer 5b is of the type described in the European patent application No. EP-A-1253399, filed on Apr. 27, 2001 or in U.S. Pat. No. 5,955,668. Alternatively, the inertial sensor 5 can comprise three single-axis accelerometers oriented in mutually perpendicular directions, or a single tri-axial accelerometer.

In greater detail, the first accelerometer 5a has a first detection axis X and a second detection axis Y, which are mutually perpendicular and parallel to a sliding surface PS of the mouse 1 (generally a horizontal plane, as in FIG. 2). The first detection axis X and the second detection axis Y are, moreover perpendicular and parallel, respectively, to a (vertical)

longitudinal plane PL of symmetry of the shell 2. The second accelerometer 5b has a third detection axis Z, which is not coplanar with and is preferably perpendicular to the plane defined by the first detection axis X and the second detection axis Y. The third axis Z is therefore substantially vertical when the mouse 1 is resting on the surface of sliding PS.

The inertial sensor 5 is connected to the microcontroller 6 to provide a first analog acceleration signal $S_X$, a second analog acceleration signal $S_Y$, and a third analog acceleration signal $S_Z$ (FIG. 3) in response to the accelerations to which the shell 2 and the inertial sensor 5 are subjected along the first, second, and third axes of detection X, Y, Z, respectively.

The microcontroller 6 is connected to the computer system 8 through the interface 7 (FIG. 3) and supplies a first acceleration signal $A_X$ and a second acceleration signal $A_Y$, a first velocity signal $V_X$ and a second velocity signal $V_Y$, and a first displacement signal $P_X$ and a second displacement signal $P_Y$, all of which are of a numeric type and are calculated starting from the first and second analog acceleration signals $S_X$, $S_Y$. In a pre-determined operating mode, which will be described in greater detail hereinafter, the microcontroller 6 supplies also a third acceleration signal $A_Z$, a third velocity signal $V_Z$, and a third displacement signal $P_Z$, which are of a numeric type and are calculated starting from the third analog acceleration signal $S_Z$. In a way in itself known, the computer system 8 displays a cursor on a screen and determines its position on the basis of the signals received from the mouse 1.

In greater detail, the microcontroller 6 comprises a reading unit 9 and a processing unit 10. The reading unit 9 is connected to the inertial sensor 5 for receiving the first, second, and third analog acceleration signals $S_X$, $S_Y$, $S_Z$. In a way in itself known, moreover, the reading unit 9 supplies the inertial sensor 5 with control signals $V_{FB}$ and clock signals $V_{CK}$ for reading; and the processing unit 10 with the first, second and third acceleration signals $A_X$, $A_Y$, $A_Z$, obtained from the analog-to-digital conversion of the first, second and third analog acceleration signals $S_X$, $S_Y$, $S_Z$, respectively.

Figure 4:
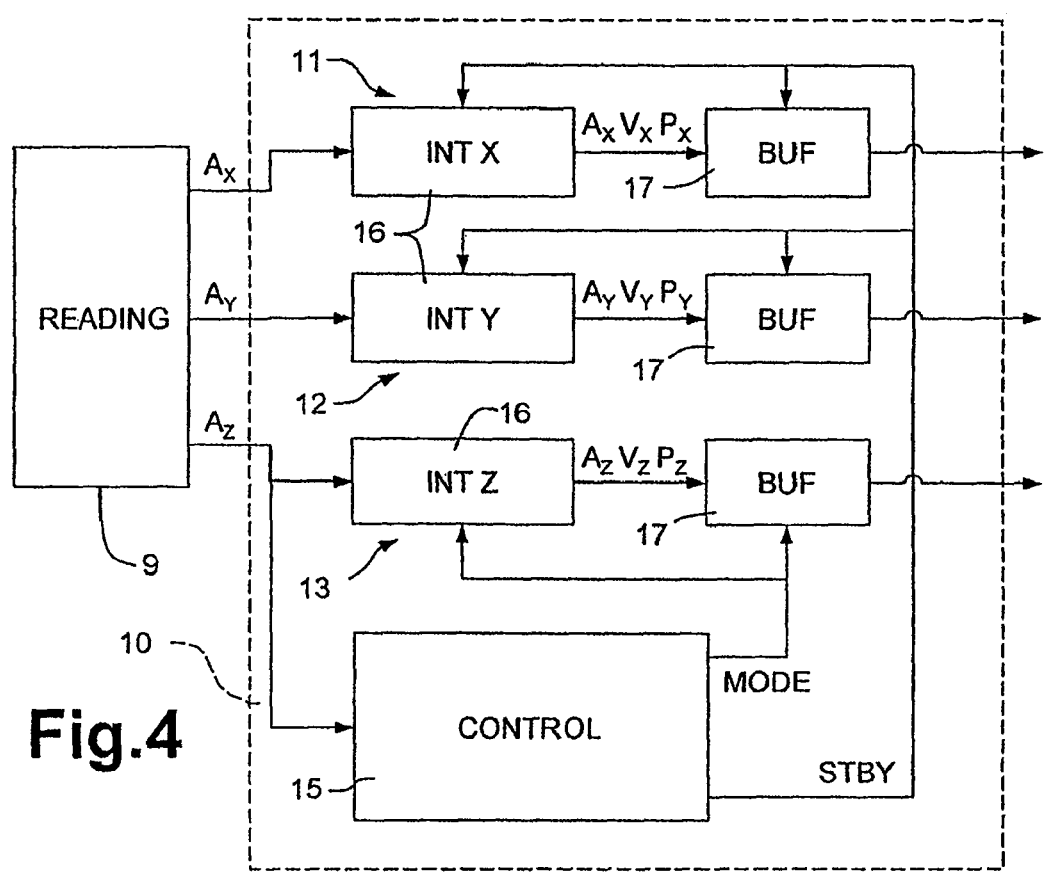
FIG. 4 is a more detailed block diagram regarding a part of the device illustrated in FIGS. 1-3.

As illustrated in the block diagram of FIG. 4, the processing unit 10 comprises a first calculation line 11, a second calculation line 12, a third calculation line 13, and a control stage 15. The first, second and third calculation lines 11, 12, 13 each comprise a respective integration stage 16 and a respective buffer 17, which are cascade-connected. The integration stages 16 of the first, second and third calculation lines 11, 12, 13 receive, from the reading unit 9, the first, second and third acceleration signals $A_X$, $A_Y$, $A_Z$, respectively, and integrate them a first time and a second time. In this way, the integration stage 16 of the first calculation line 11 generates and supplies the respective buffer 17 with the first velocity signal $V_X$ and the first displacement signal $P_X$. The integration stage 16 of the second calculation line 12 generates and supplies the respective buffer 17 with the second velocity signal $V_Y$ and the second displacement signal $P_Y$. Finally, the integration stage 16 of the third calculation line 13 generates and supplies the respective buffer 17 with the third velocity signal $V_Z$ and the third displacement signal $P_Z$. When the buffers 17 are enabled by the control stage 15, the values contained therein are made available to the interface 7 for transmission to the computer system 8.

The control stage 15 is connected to the reading unit 9 for receiving the third acceleration signal $A_Z$, which is used for selecting one between a first operating mode, or 2D mode, and a second operating mode, or 3D mode, and, moreover, for disabling temporarily the first and second calculation lines 11, 12 when the mouse 1 is lifted off the sliding surface and the 2D mode is selected. For this purpose, the control stage 15 generates a first control signal MODE and a second control signal STBY. The first control signal MODE has a first value 2D, for the 2D mode, and a second value 3D, for the 3D mode, and is supplied to the third calculation line 13, which is selectively enabled in the 3D mode and disabled in the 2D mode. The second control signal STBY has a first value T, when the mouse 1 is lifted off the sliding surface PS and the 2D mode is activated, and a second value F otherwise. The first and second calculation lines 11, 12 are selectively enabled and disabled in the presence, respectively, of the second value F and of the first value T of the second control signal STBY.

In the 2D mode the mouse 1 is configured to operate as a conventional mouse and sends only the first and second velocity signals $V_X$, $V_Y$ and the first and second displacement signals $P_X$, $P_Y$ to the computer system 8. The second accelerometer 5b, instead, is used for monitoring lifting of the mouse 1 from the sliding surface PS, but the third calculation line 13 is disabled and does not supply information to the computer system 8. As soon as the mouse 1 is lifted, the control stage detects a non-zero acceleration along the third detection axis Z using the third acceleration signal $A_Z$. In this case, the second control signal STBY is set at the first value T, and the first and second calculation lines 11, 12 are temporarily disabled, until the mouse 1 is again resting on the sliding surface PS. In this condition, which in effect represents a third operating mode, which can be selected transitorily, the control stage 15 completely inhibits issuing to the computer system 8 of signals indicative of the motion of the mouse 1 and hence prevents undesirable displacements of the cursor appearing on the display of the computer system 8 itself.

If the third acceleration signal $A_Z$ indicates that the mouse 1 has remained lifted from the surface of sliding PS for longer than a pre-determined switching interval $T_{COM}$, the control stage 15 selects the 3D mode, in which the first, second and third calculation lines 11, 12, 13 are all enabled. The 3D mode is maintained as long as the mouse 1 remains lifted from the surface of sliding PS. In this configuration, also the third acceleration signal $A_Z$, coming from the second accelerometer 5b, is processed by the third calculation line 13, and hence information regarding the motion of the mouse 1 in three dimensions is sent to the computer system 8.

Figures 5, 7:
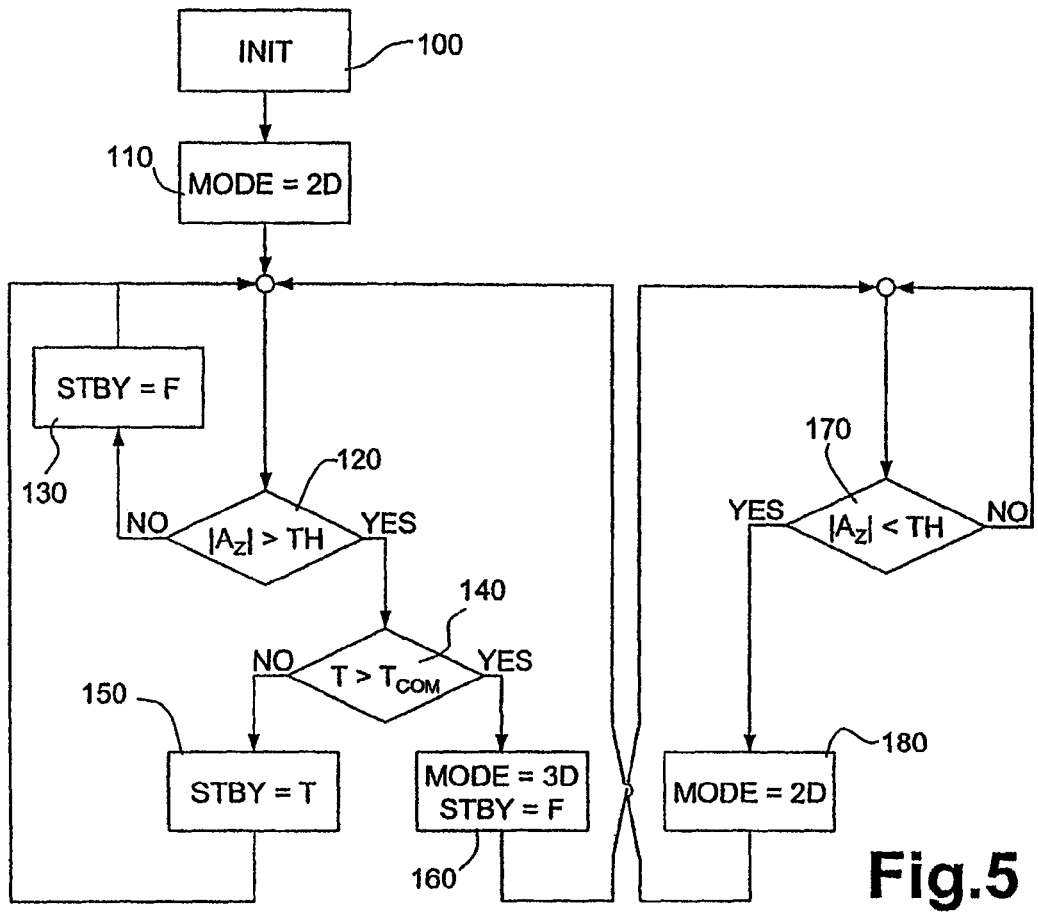
FIG. 5 is a flowchart for a procedure implemented by the device according to one embodiment of the invention.
FIG. 7 shows a table regarding a detail of FIG. 6.

In practice, the control stage 15 executes the procedure illustrated in the flowchart of FIG. 5. At start-up of the computer system 8, the mouse 1 is initialized (block 100) and set in the 2D mode (block 110). Then, in order to establish whether the mouse 1 has been lifted, the absolute value of the third acceleration signal $A_Z$ is compared with a threshold TH (block 120). The threshold TH can be pre-determined and is preferably programmable in a set-up step of the mouse 1. Alternatively, the threshold TH is continuously recalculated when the mouse 1 is in 2D mode, to take into account the effect of the force of gravity on the second accelerometer 5b, which can vary according to the inclination of the sliding surface PS. In this case, the fact that the contribution of the force of gravity is substantially constant if the mouse 1 moves along a plane, such as the sliding surface PS, is exploited, and such a contribution can be estimated by filtering the third acceleration signal $A_Z$ with a low-pass filter, which extracts the low-frequency spectral components. In both cases, the threshold TH is determined so as to be exceeded even when the mouse 1 is subjected to minimal accelerations along the third axis Z, such as the accelerations caused by involuntary movements of the user when the mouse 1 is kept lifted up. It should be noted that the effects of involuntary movements can be suppressed to prevent undesirable displacements of the cursor when the mouse 1 is in the 3D mode. For this purpose, for example, it is possible to envisage appropriate algorithms of integration for the integrators 16, which are selectively activatable when the first control signal MODE has the second value 3D.

If the absolute value of the third acceleration signal $A_Z$ is lower than the threshold TH (output NO from block 120), the second control signal is set at the second value F (block 130), and the test of block 120 is carried out again.

If the absolute value of the third acceleration signal $A_Z$ is not lower than the threshold TH (output YES from block 120), the control stage 15 checks (block 140) whether the mouse 1 has remained lifted up for a time longer than the switching interval $T_{COM}$, i.e., whether, in said interval, the threshold TH has been exceeded substantially without any interruption. If the switching interval $T_{COM}$ has not yet elapsed (output NO from block 140), the second control signal STBY is set at the first value T for temporary disabling of the first and second calculation lines 11, 12 (block 150). If the mouse 1 remains lifted until the end of the switching interval $T_{COM}$ without resting on the surface of sliding PS or on a different surface, herein not illustrated (output YES from block 140), the control stage 15 selects the 3D mode, by setting the first control signal MODE at the second value 3D (block 160).

The 3D mode is maintained as long as the absolute value of the third acceleration signal $A_z$ remains higher than the threshold TH (block 170 and output NO from block 170). Possibly, a further threshold can be used, different from the threshold TH. When the mouse 1 is put down, the third acceleration signal $A_z$ drops below the threshold TH (output YES from block 170). In this case, the control stage 15 selects the 2D mode (block 180), and the test of the block 120 is carried out again.

Figure 6:
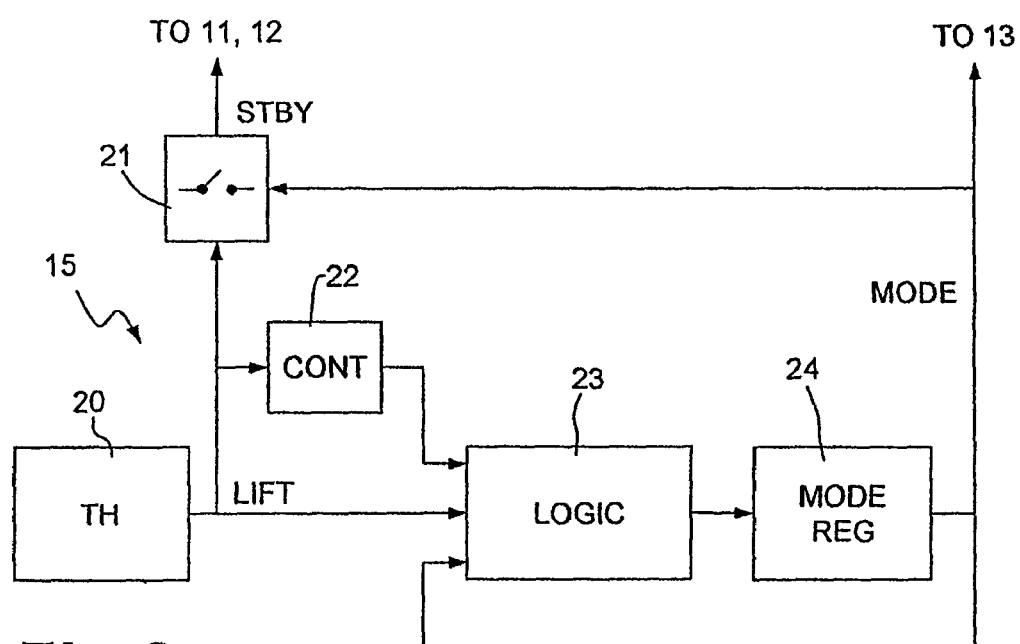
FIG. 6 is a block diagram of a part of the device of FIG. 4, which implements the procedure of FIG. 5.

An example of the control stage 15 is illustrated in FIG. 6. In particular, the control stage 15 comprises a threshold-discrimination module 20, a gate 21, a counter 22, a logic module 23, and a mode register 24.

The threshold-discrimination module 20 receives the third acceleration signal $A_Z$ from the reading unit 9 and uses it to establish whether the mouse 1 is resting on a surface or has been lifted (in the example described, it compares the third acceleration signal $A_Z$ with the threshold TH). If the mouse 1 has been lifted, the threshold-discrimination module 20 requests deactivation of the first and second calculation lines 11, 12 through the gate 21 and activates the counter 22. In particular, the threshold-discrimination module 20 assigns, to a third control signal LIFT, a pre-set value, which indicates that the mouse 1 has been lifted (in this case, following an overstepping of the threshold TH). The gate 21, which supplies at output the second control signal STBY, is controlled by the first control signal MODE, the value of which is stored in the mode register 24. In particular, the gate 21 enables the request for deactivation of the first and second calculation lines 11, 12 when the first value 2D of the first control signal MODE is contained in the mode register 24. In this case, the first value T is assigned to the second control signal STBY.

The logic module 23 controls the mode register 24 so as to keep the value of the first control signal MODE updated and to select the 2D mode or the 3D mode in accordance with the procedure described above with reference to FIG. 5. For this purpose, the logic module 23 receives the current value of the first control signal MODE from the mode register 24, the third control signal LIFT from the threshold-discrimination module 20, and a counting value contained in the counter 22. In the example described, the logic module 23 operates on the basis of the table of FIG. 7, where the new value to be assigned and the current value of the first control signal MODE are indicated in the columns "$MODE_{K+1}$" and "$MODE_K$", respectively. Furthermore, in the column "LIFT", the values T' and F' indicate that the mouse 1 has been lifted and put down, respectively; and in the column "$T_{COM}$", the values T" and F" indicate that, on the basis of the counting value contained in the counter 22, the mouse 1 has remained continuously lifted for a time longer than or shorter than, respectively, the switching interval $T_{COM}$.

Advantageously, one embodiment of the invention enables automatic detection of lifting of the pointing device and, consequently, selection of an appropriate operating mode. In particular, the device can be used both as a two-dimensional pointing peripheral and as a three-dimensional pointing peripheral. Furthermore, production of signals is inhibited during the brief steps of lifting that normally occur when the device operates in two-dimensional mode. Also the selection of the mode of operation is automatic, and the user is not required to perform any special maneuvers.

Finally, it is evident that modifications and variations can be made to the pointing device and to the method described herein, without departing from the scope of the present invention, as defined in the annexed claims.

In particular, the invention could be incorporated in a device other than a mouse, such as for example a pen or a cell phone. As regards detection of the motion along the first and second axes X, Y, the pointing device can be equipped with a transducer of the type conventionally used in a mouse (for example, a transducer with a ball combined with rollers provided with angular-position sensors or an optical transducer). In this case, just one single-axis MEMS sensor is used for detection of the motion along the third axis Z.

Also the procedure of selection of the operating mode could differ from the one described herein. In particular, different criteria could be used to decide whether the pointing device has been lifted or is resting on a surface. For example, differentiated thresholds can be used, instead of just one threshold. Furthermore, in addition to acceleration, it is also possible to consider the velocity along the third axis Z. Also the scheme of the control stage would be modified accordingly.

The invention claimed is:

1. A pointing device for a computer system comprising:
 a first movement sensor, for detecting movements of said device along a first axis and a second axis, which are not aligned;
 a second movement sensor, for detecting movements of said device along a third axis not aligned to said first and second axes; and
 a processor coupled to said first and second movement sensors for producing a plurality of movement signals indicating the movement of said device along said first, second and third axes, said processor comprising a control stage for controlling a mode of production of said movement signals based on a response of said second movement sensor, wherein; said processor comprises a first calculation line and a second calculation line associated with said first movement sensor for producing a first set of said movement signals indicative of the movement of said device along said first and second axes; and said control stage is configured to selectively enable and disable said first and second calculation lines based on said response of said second movement sensor.

2. The device according to claim 1, wherein said control stage is configured for temporarily disabling said first and second calculation lines in response to the detection of an acceleration of said device along said third axis.

3. The device according to claim 2, wherein said control stage comprises a threshold-discrimination module, for comparing said response of said second movement sensor with a threshold and generating a control signal based on said response and of said threshold.

4. The device according to claim 3, wherein said control stage comprises a mode selector configured to alternatively select a first operating mode and a second operating mode of said device based on said response, said threshold, and a time interval.

5. The device according to claim 4 wherein:
said processor is configured to produce said movement signals based on a response of said first movement sensor when said first operating mode is selected; and
said processor is configured to produce said movement signals based on said response of said first movement sensor and of said response of said second movement sensor when said second operating mode is selected.

6. The device according to claim 5, wherein:
said processing comprises a third calculation line, associated to said second movement sensor for producing a second set of said movement signals, indicative of the movement of said device along said third axis; and
said control stage is configured to select said third calculation line when said second operating mode is selected, and disable said third calculation line, when said first operating mode is selected.

7. The device according to claim 1, wherein said third axis is substantially vertical.

8. The device according to claim 1, wherein said first movement sensor comprises a first MEMS accelerometer.

9. The device according to claim 1, wherein said second movement sensor comprises a second MEMS accelerometer.

10. A method for controlling a pointing device for a computer system, the method comprising:
detecting movements of said device along a first axis and a second axis;
detecting movements of said device along a third axis not coplanar with said first and second axes;
producing a plurality of movement signals indicative of the movement of said device along said first, second and third axes;
controlling a mode of production of said movement signals in response to movements of said device along said third axis, wherein controlling comprises selectively enabling and inhibiting production of said movement signals in response to movements of said device along said third axis.

11. The method according to claim 10, comprising disabling temporarily the production of said movement signals in response to the detection of an acceleration of said device along said third axis.

12. The method according to claim 11, comprising detecting lifting of said device in response to movements of said device along said third axis.

13. The method according to claim 10, comprising alternatively selecting a first operating mode and a second operating mode of said device in response to movements of said device along said third axis and on a basis of a pre-determined time interval.

14. The method according to claim 13, wherein:
when said first operating mode is selected, said movement signals are produced on the basis of movements of said device along said first and second axes; and
when said second operating mode is selected, said movement signals are produced on the basis of movements of said device along said first, second and third axes.

15. The method according to claim 14 comprising:
producing said movement signals on the basis of the movement of said device along said first and second axes, when said first operating mode is selected; and
producing said movement signals on the basis of the movement of said device along said first, second and third axes, when said second operating mode is selected.

16. The method according to claim 15, wherein said second operating mode is selected after an acceleration along said third axis has been detected without interruption for a time longer than said pre-set time interval.

17. The method according to claim 10, wherein said third axis is substantially vertical.

18. The method according to claim 10, wherein detecting movements of said device along a first axis and a second axis comprises using a first MEMS accelerometer.

19. The method according to claim 10, wherein detecting movements of said device along a third axis comprises using a second MEMS accelerometer.

20. A pointing device comprising:
a motion sensor configured to detect motion along first, second, and third mutually transverse axes; and
a processor configured to produce movement signals indicating a respective movement of said device along the first, second, and third axes, the movement signals being configured to cause a visible movement of a cursor on a screen of a computer, the visible movement corresponding to a movement of the device along the first and second axes, the processor including:
a control stage configured to temporarily prevent the movement signals from causing the visible movement of the cursor after a movement of the device along the third axis has been detected.

21. The device according to claim 20 wherein the motion sensor comprises first and second accelerometers.

22. The device according to claim 21 wherein the first accelerometer detects motion along the first and second axes and the second accelerometer detects motion along the third axis.

23. The device according to claim 20 wherein the control stage may enter a first mode causing the processor to temporarily disable the production of movement signals corresponding to movement along the third axis.

24. The device according to claim 23 wherein the control stage may enter into a standby mode causing the processor to temporarily disable the production of movement signals corresponding to movement along the first and second axes.

25. The device according to claim 24 wherein if an acceleration along the third axis is greater than a predetermined threshold acceleration, the control stage enters into the standby mode.

26. A pointing device for a computer system comprising:
a first movement sensor, for detecting movements of said device along a first axis and a second axis, which are not aligned;
a second movement sensor, for detecting movements of said device along a third axis not aligned to said first and second axes; and
a processor coupled to said first and second movement sensors for producing a plurality of movement signals indicating the movement of said device along said first, second and third axes, said processor comprising:
a first calculation line and a second calculation line associated with said first movement sensor for producing a first set of said movement signals indicative of the movement of said device along said first and second axes; and a control stage for controlling a mode of production of said movement signals based on a response of said second movement sensor, the control stage configured to selectively enable and disable said first and second calculation lines based on said response of said second movement sensor, wherein the control stage is configured to temporarily disable said first and second calculation lines in response to the detection of an acceleration of said device along said third axis, the control stage including:
- a threshold-discrimination module, for comparing said response of said second movement sensor with a threshold and generating a control signal based on said response and of said threshold; and
- a mode selector configured to alternatively select a first operating mode and a second operating mode of said device based on said response, said threshold, and a time interval.

27. The device according to claim 26 wherein:
said processor is configured to produce said movement signals based on a response of said first movement sensor when said first operating mode is selected; and
said processor is configured to produce said movement signals based on said response of said first movement sensor and of said response of said second movement sensor when said second operating mode is selected.

28. The device according to claim 27, wherein:
said processing comprises a third calculation line, associated to said second movement sensor for producing a second set of said movement signals, indicative of the movement of said device along said third axis; and
said control stage is configured to select said third calculation line when said second operating mode is selected, and disable said third calculation line, when said first operating mode is selected.

29. A method for controlling a pointing device for a computer system, the method comprising:
- detecting movements of said device along a first axis and a second axis;
- detecting movements of said device along a third axis not coplanar with said first and second axes;
- producing a plurality of movement signals indicative of the movement of said device along said first, second and third axes;
- controlling a mode of production of said movement signals in response to movements of said device along said third axis; and
- alternatively selecting a first operating mode and a second operating mode of said device in response to movements of said device along said third axis and on a basis of a predetermined time interval.

30. The method of claim 29, wherein
when said first operating mode is selected, said movement signals are produced on the basis of movements of said device along said first and second axes; and
when said second operating mode is selected, said movement signals are produced on the basis of movements of said device along said first, second and third axes.

31. The method according to claim 30 comprising:
producing said movement signals on the basis of the movement of said device along said first and second axes, when said first operating mode is selected; and
producing said movement signals on the basis of the movement of said device along said first, second and third axes, when said second operating mode is selected.

32. The method according to claim 31, wherein said second operating mode is selected after an acceleration along said third axis has been detected without interruption for a time longer than said pre-set time interval.

* * * * *